United States Patent [19]
Spivack et al.

[11] 3,943,102
[45] Mar. 9, 1976

[54] COMPOSITIONS STABILIZED WITH POLYOL ESTERS OF BENZOYLOXYBENZOIC ACIDS

[75] Inventors: John J. Spivack, Spring Valley; John J. Luzzi, Carmel, both of N.Y.

[73] Assignee: Ciba-Geigy Corporation, Ardsley, N.Y.

[22] Filed: Mar. 17, 1975

[21] Appl. No.: 558,983

Related U.S. Application Data

[62] Division of Ser. No. 318,326, Dec. 26, 1972, Pat. No. 3,884,960.

[52] U.S. Cl. ................. 260/45.85 B; 260/45.95 D
[51] Int. Cl.² ......................................... C08J 3/20
[58] Field of Search .............. 260/45.95 D, 45.85 B

[56] References Cited
UNITED STATES PATENTS 3,717,611 2/1973 Baumer et al. ............... 260/45.85 R
3,814,729 6/1974 Gouch .......................... 260/45.85 R

*Primary Examiner*—V. P. Hoke
*Attorney, Agent, or Firm*—Nestor W. Shust

[57] ABSTRACT

Benzoyloxybenzoates having the formula

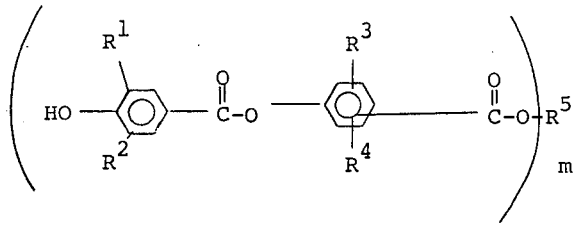

wherein
$R^1$, $R^2$ and $R^3$ are lower alkyl or cycloalkyl,
$R^4$ is hydrogen, lower alkyl or cycloalkyl,
$R^5$ is alkylene or oxyalkylene having up to 18 carbon atoms, and
$m$ is an integer from 2 to 4, are useful as stabilizers of organic materials such as polyolefins.

11 Claims, No Drawings

COMPOSITIONS STABILIZED WITH POLYOL ESTERS OF BENZOYLOXYBENZOIC ACIDS

This is a divisional of application Ser. No. 318,326, filed on Dec. 26, 1972, now U.S. Pat. No. 3,884,960.

BACKGROUND OF THE INVENTION

Polymeric materials have one important deficiency which must be overcome before they can be used in various commercial applications. This deficiency is the susceptibility to oxidative and actinic degradation. Many varieties of compounds have been known to be useful as stabilizers of various polymers, but all of them have certain deficiencies which limits the usefulness of such stabilizers. Thus, one class of stabilizers disclosed in the prior art that is related to the compounds of this invention is hindered hydroxybenzoates disclosed in U.S. Pat. Nos. 3,029,276; 3,112,338; 3,206,431 and 3,502,613.

Most of the compounds disclosed in said patents are various esters of 3,5-dialkyl-4-hydroxybenzoic acids while the benzoyloxybenzoates of this invention are esters of 4-(3,5-dialkyl-4-hydroxybenzoyloxy) mono (and dialkyl) benzoic acids. The most closely related compound in the prior art is ethyl-4-(3,5-di-t-butyl-4-hydroxybenzoyloxy) benzoate disclosed in U.S. Pat. No. 3,206,431. In this compound the phenyl ring in the benzoate group is completely unsubstituted while the corresponding group in the compounds of this invention has one or two alkyl substituents. Furthermore, in the prior art compound the ester group is an alkyl group while in the instant compounds the ester group is an alkylene group or oxyalkylene group having two to four benzoate moieties bonded thereto. The important difference in the properties between the prior art compounds discussed above and the benzoyloxybenzoates of this invention is the improved thermal stability of the instant compounds. This is a very important feature because the polymer substrates which are stabilized with such compounds are subjected to high temperature processing during the various manufacturing stages. Compounds which are not thermally stable will decompose during processing which will result in decreased stabilization effectiveness during the life of the polymer and also may introduce discoloration.

Furthermore, the compounds of this invention have better gas fading properties and have better water and organic solvent extraction resistance than the prior art compounds.

DETAILED DISCLOSURE

This invention relates to hindered benzoyloxybenzoate compounds and organic compositions stabilized therewith. More specifically, these compounds are useful as stabilizers of organic materials which are subject to thermal, oxidative and ultraviolet light degradation. The novel benzoyloxybenzoate compounds can be represented by the formula

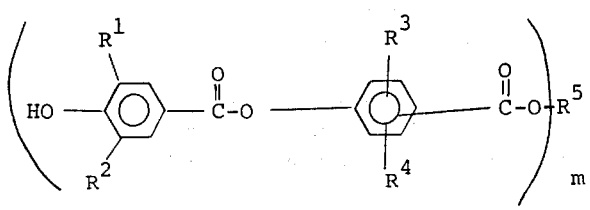

wherein
$R^1$, $R^2$ and $R^3$ are (lower)alkyl or (lower) cycloalkyl groups,
$R^4$ is hydrogen, (lower)alkyl or (lower)cycloalkyl groups,
$R^5$ is alkylene or oxyalkylene having up to 18 carbon atoms, and
$m$ is an integer from 2 to 4.

Each of the groups $R^1$, $R^2$, $R^3$ and $R^4$ can be the same or different (lower)alkyl groups having from 1 to 8 carbon atoms, namely, n-propyl, isopropyl, n-butyl, sec-butyl, tert-butyl, sec-amyl, tert-amyl, n-hexyl, sec-hexyl, sec-octyl, tert-octyl and the like. These groups can also be (lower)cycloalkyl groups having 4 to 8 carbon atoms such as cyclobutyl, cyclopentyl, cyclohexyl or cyclooctyl groups. $R^4$ can also be hydrogen.

Although groups $R^1$, $R^2$, $R^3$ and $R^4$ can be any (lower)alkyl groups stated above, it is preferable that $R^1$ and $R^2$ groups be secondary or tertiary and especially tertiary alkyl groups having from 4 to 8 carbon atoms and most preferably tertiary butyl. Tertiary butyl groups are found to be very effective. The above formula indicates that $R^3$ and $R^4$ can be substituted on any of the four open positions in the benzene ring but preferably both groups are ortho to the benzoic acid moiety.

The group $R^5$ is an alkylene or an oxyalkylene having up to 18 carbon atoms and for economic reasons they have preferably up to 12 carbon atoms. By oxyalkylene is intended to include mono and polyoxyalkylenes such as di and trioxyalkylene groups. These groups are derived from alkylene glycols and polyalkylene glycols. These groups can be straight chain or branched chain and they are derived from various polyols, such as for example ethylene glycol, 1,2 and 1,3-propylene glycols, 1,10-decanediol, 2,2,4-trimethylhexanediol, diethylene glycol, neopentylglycol, trimethylolethane, glycerol, pentaerythritol, 1,2,3,4-tetrahydroxybutane and the like.

Following are illustrative examples of the compounds of this invention:

1,6-hexanediol-bis-{4-(3,5-di-t-butyl-4-hydroxybenzoyloxy)-3,5-di-t-butylbenzoate}
1,4-butanediol-bis-{4-(3,5-di-t-butyl-4-hydroxybenzoyloxy)-3,5-di-t-butylbenzoate}
1,6-hexanediol-bis-{4-(3,5-di-t-butyl-4-hydroxybenzoyloxy)-3,5-dimethylbenzoate}
1,6-hexanediol-bis-{4-(3,5-diisopropyl-4-hydroxybenzoyloxy)-3,5-dimethylbenzoate}
ethylene glycol-bis{4-(3,5-diisopropyl-4-hydroxybenzoyloxy)-3,5-diisopropylbenzoate}
1,2-propylene glycol-bis-{4-(3-t-amyl-5-methyl-4-hydroxybenzoyloxy)-3,5-di-t-amylthiobenzoate}
1,3-propylene glycol-bis-{4-(3,5-di-t-butyl-4-hydroxybenzoyloxy)-3,5-dimethylbenzoate}
1,9-nonanediol-bis-{4-(3,5-diethyl-4-hydroxybenzoyloxy)-3,5-dimethylbenzoate}
1,10-decanediol-bis-{4-(3,5-di-t-butyl-4-hydroxybenzoyloxy)-3,5-dimethylbenzoate}
2,2,4-trimethylhexanediol-bis-{4-(3,5-di-tert.butyl-4-hydroxybenzoyloxy)-3,5-diisopropylbenzoate}
2,4,4-trimethylhexanediol-bis-{4-(3,5-di-t-butyl-4-hydroxybenzoyloxy)3,5-di-t-butylbenzoate}
diethylene glycol-bis-{4-(3,5-diisopropyl-4-hydroxybenzoyloxy)-3,5-diisopropylbenzoate}
neopentyl glycol-bis-{4-(3,5-di-t-butyl-4-hydroxybenzoyloxy)-3,5-di-t-butylbenzoate} triethylene glycol-bis-{4-(3,5-di-octyl-4-hydroxybenzoyloxy)-3,5-di-octylbenzoate}
tetraethylene glycol-bis-{4-(3,5-di-t-butyl-4-hydroxybenzoyloxy)-3,5-di-t-butylbenzoate}
trimethylolethane-tris-{4-(3,5-di-t-butyl-4-hydroxybenzoyloxy)-3,5-di-t-butylbenzoate}
trimethylolpropane-tris-{4-(3,5-di-t-octyl-4-hydroxybenzoyloxy)-3,5-di-t-octylbenzoate}
trimethylolbutane-tris-{4-(3,5-di-t-butyl-4-hydroxybenzoyloxy)-3,6-dimethylbenzoate}
glycerol-tris-{4-(3,5-di-t-butyl-4-hydroxybenzoyloxy)-3,5-di-t-butylbenzoate}
pentaerithrytol-tetrakis-{4-(3,5-di-t-butyl-4-hydroxybenzoyloxy)-3,5-di-t-butylbenzoate}
1,2,3,4-tetrahydroxybutane-tetrakis-{4-(3,5-di-t-butyl-4-hydroxybenzoyloxy)-3,5-dimethylbenzoate}.

The compounds of this invention when $R^1$ and $R^2$ are different from $R^3$ and $R^4$ can be prepared by reacting a hindered phenolic acid chloride such as 3,5-di-tert-butyl-4-hydroxybenzoylchloride with an appropriate alkyl substituted benzoate at a temperature of from about 50° to 200° C. Compounds where $R^1$ and $R^2$ are the same as $R^3$ and $R^4$ can be prepared by reacting two moles of a dialkyl substituted hydroxybenzoyl halide with one mole of a base to yield an intermediate compound which is (di-alkyl substituted hydroxybenzoyloxy)-dialkyl benzoyl halide which in turn is reacted with an appropriate glycol or a polyol to give the desired product. The basic materials which can be employed are trialkyl amines such as triethyl amine, tripropyl amine, triisopropyl amine, tributyl amine, triamyl amine, sodium or potassium hydroxide, sodium or potassium carbonates or other similar proton acceptors. Both reactions mentioned above can be carried out neat or in a non-reactive solvent such as a hydrocarbon as for example, hexane, cyclohexane, heptane, nonreactive chlorinated hydrocarbon, mineral oil, and preferably benzene or toluene.

The preparation of these compounds is further illustrated in greater detail in the examples below.

EXAMPLE 1

Preparation of 4-(3,5-di-t-butyl-4-hydroxybenzoyloxy)-3,5-di-t-butyl-benzoyl chloride To 445 ml. of a toluene solution containing 107.2 grams of 3,5-di-t-butyl-4-hydroxybenzoyl chloride (0.40 moles) cooled to 10° C was added 24.4 grams (0.24 moles) of triethylamine over a period 20 minutes at 10° to 15° C. The turbid reaction mixture was maintained at room temperature for about 19 hours and then heated at 80° C for 1 hour. The precipitate was removed by filtration and washed with a little toluene. The clear filtrate was concentrated in vacuo at 40° to 50° C at 20 mm. Hg. pressure and kept at this same temperature for 45 minutes at 20 mm. Hg. pressure to yield 105 grams of residue. The residue was triturated with 200 ml. of warm petroleum ether, and the slurry cooled. The white crystals were filtered yielding 70 grams of the product. After recrystallization from heptane and acetonitrile and drying at 95° C for 5 hours at 0.1 mm Hg. pressure the melting point of the product was 210°–213° C.

EXAMPLE 2

Preparation of 1,6-hexanediol-bis-{4-(3,5-ditert.butyl-4-hydroxybenzoyloxy)-3,5-ditert-butylbenzoate}

To 10.00 ml of toluene were added 10.00 grams of 4-(3,5-di-tert.butyl-4-hydroxybenzoyloxy)-3,5-di-tert.butylbenzoyl chloride, 2.4 grams of 1,6-hexanediol and 2.0 grams of triethylamine and the reaction mixture was stirred for 2 hours at room temperature and then heated with stirring at 95° to 98° C for 3 hours. The precipitated triethylamine hydrichloride was filtered and the toluene solution washed with water and dried over anhydrous sodium sulfate. The product (9 grams) was isolated by distillation of the toluene at reduced pressure. After crystallization successively from n-heptane, isopropanol and acetonitrile, the product was isolated as white crystals melting at 226°–228° C.

EXAMPLE 3

Preparation of triethylene glycol-bis-{4-(3,5-di-tert.butyl-4-hydroxybenzoyloxy)-3,5-di-tert.butylbenzoate}

15.0 grams of 4-(3,5-di-tert.butyl-4-hydroxybenzoyloxy)-3,5-tert.butylbenzoyl chloride 2.25 grams of triethylene glycol and 3.10 grams of triethylamine were stirred together in 100 ml. of toluene at room temperature for 2 hours and then heated at reflux for 2 hours. The reaction mixture was cooled to room temperature and the precipitated triethylamine hydrochloride filtered. The filtrate was concentrated to dryness by distillation of the solvent initially at about 20 mm Hg. pressure and finally at 0.3 mm Hg. pressure to yield about 16.1 grams of the product. The product was crystallized twice from isopropanol yielding white crystals melting at 123°–133° C.

Following the above procedure, except that triethylene glycol is replaced with 1,10-decanediol, diethylene glycol and 1,3-propylene glycol, the following compounds are prepared:

1,10-decanediol-bis-{4-(3,5-di-t-butyl-4-hydroxybenzoyloxy)-3,5-di-t-butylbenzoate}
diethylene glycol-bis-{4-(3,5-di-t-butyl-4-hydroxybenzoyloxy)-3,5-di-t-butylbenzoate} and
1,3-propylene glycol-bis-{4-(3,5-di-t-butyl-4-hydroxybenzoyloxy)-3,5-di-t-butylbenzoate}.

EXAMPLE 4

Preparation of 2,2-dimethyl-1,3-propanediol-bis-{4-(3,5-di-t-butyl-4-hydroxybenzoyloxy)3,5-di-t-butylbenzoate}

Following substantially the procedure of Example 3, two moles of 3,5-di-t-butyl-4-hydroxybenzoyl chloride are reacted with one mole of triethylamine and the resulting intermediate is in turn reacted with one mole of 2,2-dimethyl-1,3-propanediol to yield the above named product which has a melting point of 230°–240° C.

Following the procedure of Example 3, 3,5-dimethyl-4-hydroxybenzoyl chloride, 3,5-diisopropyl-4-hydroxybenzoyl chloride, 3,5-di-t-octyl-4-hydroxybenzoyl chloride and 3-t-butyl-5-methyl-4-hydroxybenzoyl chloride are reacted respectively with 1,2-propylene glycol, 2,2,4-trimethylhexanediol, neopentyl glycol and tetraethylene glycol to yield the following compounds:

1,2-propylene glycol-bis-{4-(3,5-dimethyl-4-hydroxybenzoyloxy)-3,5-dimethylbenzoate}
2,2,4-trimethylhexanediol-bis-{4-(3,5-diisopropyl-4-hydroxybenzoyloxy)-3,5-diisopropylbenzoate}
neopentyl glycol-bis-{4-(3,5-di-t-octyl-4-hydroxybenzoyloxy)-3,5-di-t-octylbenzoate}
tetraethylene glycol-bis-{4-(3-t-butyl-5-methyl-4-hydroxybenzoyloxy)-3-t-butyl-5-methylbenzoate}

The benzoyloxybenzoates of this invention are stabilizers of organic material normally subject to thermal, oxidative or actinic light deterioration. Materials which are thus stabilized include synthetic organic polymeric substances such as vinyl resins formed from the polymerization of vinyl halides or from the copolymerization of vinyl halides with unsaturated polymerizable compounds, e.g., vinyl esters, $\alpha,\beta$-unsaturated ketones, $\alpha,\beta$-unsaturated aldehydes and unsaturated hydrocarbons such as butadienes and styrene; poly-$\alpha$-olefins such as polyethylene, polypropylene, polybutylene including copolymers of $\alpha$-olefins; dienes such as polybutadiene, polyisoprene, and the like, including copolymers with other monomers; polyurethanes and polyamides such as polyhexamethylene adipamide and polycaprolactam; polyesters such as polyethylene terephthalates; polycarbonates; polyacetals such as polyethylene terephthalate polyacetal; polystyrene, polyethyleneoxide; and copolymers such as those of high impact polystyrene containing copolymers of butadiene and styrene and those formed by the copolymerization of acrylonitrile, butadiene and/or styrene.

Other materials which can be stabilized by the compounds of the present invention include lubricating oil of the aliphatic ester type, i.e., di(2-ethylene)-azelate, pentaerythritol tetracaproate, and the like; animal and vegetable derived oils, e.g., linseed oil, fat, tallow, lard, peanut oil, cod liver oil, caster oil, palm oil, corn oil, cottonseed oil, and the like; hydrocarbon materials such as gasoline, mineral oil, fuel oil, drying oil, cutting fluids, waxes, resins, and the like, salts of fatty acids such as soaps and the like; and alkylene glycols, e.g., $\beta$-methoxyethyleneglycol, methoxytriethyleneglycol, triethylene glycol, octaethyleneglycol, dibutyleneglycol, dipropyleneglycol and the like.

Of particular importance are polyolefins and especially polypropylene because these benzoyloxybenzoates are particularly effective as UV stabilizers in polypropylene.

In general, the stabilizers of this invention are employed from about 0.01 to about 5% by weight of the stabilized composition, although this will vary with the particular substrate and application. An advantageous range is from about 0.05 to about 2% and especially 0.1 to about 1%.

For addition to polymeric substrates, the stabilizers can be blended before polymerization or after polymerization, during the usual processing operations, for example, by hot-milling, the composition then being extruded, pressed, or the like into films, fibers, filaments, hollow spheres and the like. The heat stabilizing properties of these compounds advantageously stabilize the polymer against degradation during such processing at the high temperature generally encountered. The stabilizers can also be dissolved in suitable solvents and sprayed on the surface of films, fabrics, filaments or the like to provide effective stabilization.

These compounds can also be used in combination with other additives such as antioxidants, sulfur-containing esters such as distearyl-$\beta$-thiodipropionate (DSTDP), dilauryl-$\beta$-thiodipropionate (DLTDP) in an amount of from 0.01 to 2% by weight of the organic material, and the like, pourpoint depressants, corrosion and rust inhibitors, dispersing agents, demulsifiers, antifoaming agents, carbon black, accelerators and other chemicals used in rubber compounding, plasticizers, color stabilizers, di- and tri-alkyl- and -alkylphenyl-phosphites, heat stabilizers, ultraviolet light stabilizers, antiozonants, dyes, pigments, metal chelating agents, dyesites and the like. Often combinations such as these, particularly the sulfur containing esters, the phosphites and/or the ultraviolet light stabilizers will produce superior results in certain applications to those expected by the properties of the individual components.

The following formula represents co-stabilizers which are in certain instances very useful in combination with the stabilizers of this invention:

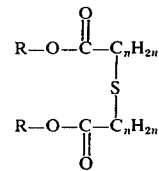

wherein R is an alkyl group having from 6 to 24 carbon atoms; and $n$ is an integer from 1 to 6. Especially useful compounds of this type are dilauryl-$\beta$-thiodipropionate and distearyl-$\beta$-thiodipropionate. The above co-stabilizers are used in the amount of from 0.01 to 2% by weight of the organic material, and preferably from 0.1 to 1%.

Although the compounds of this invention are also effective as thermal stabilizers, if the processing of the polymer is carried out at high temperatures it is advantageous to incorporate additional antioxidants.

The antioxidant compounds that can be employed are various hindered phenolic compounds which can be illustrated by the compounds listed below:

di-n-octadecyl(3-t-butyl-4-hydroxy-5-methylbenzyl)-malonate
2,6-di-t-butylphenol
2,2'-methylene-bis(6-t-butyl-4-methylphenol)
2,6-di-t-butylhydroquinone
octadecyl-(3,5-di-t-butyl-4-hydroxybenzylthio)acetate
1,1,3-tris(3-t-butyl-6-methy-4-hydroxyphenyl)-butane
1,4-bis(3,5-di-t-butyl-4-hydroxybenzyl)-2,3, 5,6-tetramethylbenzene
2,4-bis-(3,5-di-t-butyl-4-hydroxyphenoxy)-6-(n-octylthio)-1,3,5-triazine
2,4-bis-(4-hydroxy-3,5-di-t-butylphenoxy)-6-(n-octylthioethylthio)-1,3,5-triazine 2,4-bis-(n-octylthio)-6-(3,5-di-t-butyl-4-hydrox-yanilino)-1,3,5-triazine
2,4,6-tris-(4-hydroxy-3,5-di-t-butylphenoxy)-1,3,5-triazine
n-octadecyl β-(3,5-di-t-butyl-4-hydroxyphenyl) propionate
2-(n-octylthio)ethyl-3,5-di-t-butyl-4-hydroxybenzoate
stearamido N,N-bis- ethylene 3-(3,5-di-t-butyl-4-hydroxyphenyl)propionate
1,2-propylene glycol bis- 3-(3,5-di-t-butyl-4-hydroxyphenyl)propionate
pentaerythritol tetrakis- 3-(3,5-di-t-butyl-4-hydroxyphenyl)propionate
dioctadecyl-3,5-di-t-butyl-4-hydroxybenzylphosphonate
di-n-octadecyl-1-(3,5-di-t-butyl-4-hydroxyphenyl)-ethanephosphonate The above antioxidants have been listed only for the purpose of illustration and it is important to note that any other antioxidant can be employed with the same improved results. The above exemplified antioxidants are disclosed in greater detail in the following patents: Netherlands Patent No. 67/1119, issued Feb. 19, 1968; Netherlands Patent No. 68/03498 issued Sept. 18, 1968; U.S. Pat. Nos. 3,255,191; 3,330,859; 3,281,505; 3,285,855; 3,364,250; 3,368,997 and 3,357,944.

To further illustrate the present invention additional examples are presented without introducing any limitations to the description of the invention.

Outdoor Light Exposure Test

15 Denier Oriented Monofilaments

The additives are solvent blended (e.g., methylene chloride) with powdered polypropylene (Hercules Profax 6501). The solvent is then removed at room temperature in a vacuum oven with a slight air bleed. The dry mixture is melt-extruded at 450° F and pelletized. The pellets are reextruded through a monofilament die, melt spun and hot oriented 4:1 by means of a set of cold and hot Godet rolls to give 15 denier (nominal) monofilaments.

The test results reported in Examples of Table I show the percentage of retention of the original tenacity by a fiber after having been exposed to the indicated number of Kilolangleys (Kly) of Florida exposure. A Langley is a measure of energy accumulated by the fiber.

Table I shows the results of the above described outdoor test indicating amounts of the additives present. Thus, in the Additives column is given the precentage of the compound prepared in the indicated Example, which is present in the polypropylene composition in addition to the additives present in the base formulation. The remaining two columns show the number of Kilolangleys of exposure in Florida at the indicated percentage of retention of the original tenacity to which the fibers have been subjected.

TABLE I

| | Outdoor Exposure of 15 Denier Polypropylene Monofilaments in Florida | | |
|---|---|---|---|
| | Base Formulation: 0.2% IRGANOX 1093 0.1% Calcium Stearate | | |
| Ex. No. | Additive | Kilolangleys to 30% Retention of Tenacity | Kilolangleys to 50% Retention of Tenacity |
| 5 | base Formulation | 41 | 36 |
| 6 | 0.5% of triethylene goycol-bis-[4-(3,5-di-tert-butyl-4-hydroxy-benzoyloxy)-3,5-di-tert-butyl-benzoate] | 84 | 54 |

*IRGANOX 1093 is an antioxidant dioctadecyl 3,5-di-t-butyl-4-hydroxybenzylphosphonate
Proportionately good stabilization is obtained when in the compositions of Table I the compounds of th invention are present in the concentrations of 0.1% and 1%.

Artificial Light Exposure Test

Deterioration of most polymers caused by ultraviolet light is so slow at ambient temperatures even in the absence of stabilizers, that testing of the effects of stabilizers generally must be conducted either at higher temperatures or in an accelerated aritificial light exposure device in order to yield results in a convenient period of time. The test conducted on polymers using an artificial light exposure device is described below:

a. Sample Preparation 5 mil Film - Unstabilized polypropylene Powder (Hercules Profax 6501) is thoroughly blended with the indicated amounts of additives. The blended material is then milled on a two roll mill for 5 minutes at 182° C. The milled sheet is then compression molded at 220° C into 5 mil thick film under a pressure of 175 psi and water cooled in the press.

b. Testing Method

This test is conducted in a FS/BL unit, basically of the American Cyanamid design, which consists of 40 tubes of alternating fluorescent sun lamps and black lights (20 of each). The 5 mil sample film are mounted on 3 × 2 inch IR card holders with ¼ inch × 1 inch windows and are placed on a rotating drum 2 inches from the bulbs in the FS/BL unit. The time in hours is noted for the development of 0.5 carbonyl absorbance units as determined on an Infrared Spectophotometer. The development of carbonyl functional groups in the polymer is proportional to the amount of degradation caused by the ultraviolet light exposure.

The test results reported below were obtained according to the procedures described above. The amounts of the additives are expressed in weight percent based on the weight of the polymer

TABLE II

| Ex. No. | Formulation* | Time in Hours to .5 Carbonyl Absorbance Units |
|---|---|---|
| 8 | 0.5% 1,6-hexandiol-bis-[4-(3,5-di-tert.butyl-4-hydroxybenzoyloxy)-3,5-di-tert-butylbenzoate] | 320 |
| 9 | Control* | 120** |
| 10 | 0.5% 2,2-dimethyl-1,3-propanediol-bis-[4-(3,5-di-t-butyl-4-hydroxybenzoyloxy)-3,5-di-t-butylbenzoate] | 645 |

TABLE II-continued

| Ex. No. | Formulation* | Time in Hours to .5 Carbonyl Absorbance Units |
|---|---|---|
| 11 | Control | 195** |

*Each of the samples tested and the control contains 0.2% of di-n-octadecyl(3,5-di-t-butyl-4-hydroxybenzyl) phosphonate which is an antioxidant which prevents oxidative degradation of polypropylene.
**The two compounds were tested at different times therefore the controls are slightly different.

EXAMPLE 12

Pellets (500 g) of unstabilized nylon-6,6 (Zytel 101, DuPont) are placed in a Kitchen Aid Mixer. With mixing, a solution of 0.5% (based on the weight of nylon) of ethylene glycol-bis-{4-(3,5-dimethyl-4-hydroxybenzoyloxy)-3-methylbenzoate} in 20 ml of methylene chloride is added slowly. Sodium hypophosphite (0.5 gm. 0.1%) is dissolved in 20 ml of water and added slowly with mixing to the nylon pellets after the antioxidant solution has been added and most of the methylene chloride has evaporated. The stabilized pellets are dried at 80° C at <1mm for 4 hours.

The polyamide formulation is extruded at 600° F through a ¼ inch die into a rod which is water cooled and chopped into pellets. A ¾ inch Brabender extruder, equipped with a nylon screw, is used. The pellets are dried at 80° C at <1mm for 4 hours.

The dried pellets are reextruded into 5 mil (nominal) monofilament fiber which is subsequently oriented (4:1). The oriented fibers are exposed to outdoor weathering (direct and under glass) and tensile measurements are made periodically. The sample is considered to have failed when it loses 50% of its original tenacity. The sample stabilized with the above noted benzoate retained tensile strength for a much longer period than the unstabilized sample.

EXAMPLE 13

Unstabilized high impact polystyrene resin is dry blended with 0.01% by weight of the resin of 1,10-decanediol-bis-{4-(3,5-di-t-butyl-4-hydroxybenzoyloxy)-3,5-di-t-butyl-benzoate}. The resin is then extrusion compounded on a 1 inch 24/1=L/D extruder, melt temperature 500° F and then pressed for 7 minutes at a temperature of 163° C and a pressure of 2000 psi into a sheet of uniform thickness of 100 mil. The sheets are then cut into plaques of 2 inch × 2 inch. The plaques are then exposed in a FS/BL exposure device and color measurements made periodically using a Hunter Color Difference Meter Model D25. The polystyrene samples stabilized with the above benzoate developed the undesirable yellow discoloration substantially later after such discoloration occured in the unstabilized samples.

EXAMPLE 14

Unstabilized linear polyethylene is solvent blended in methylene chloride with 0.5% by weight of the substrate of 2,2,4-trimethylhexanediol-bis-{4-(3,5-di-t-butyl-4-hydroxybenzoyloxy)-3,5-di-t-butylbenzoate} and then vacuum dried. The resin is then extruded at 450° F as described in Example 30. Thereafter, the test procedure of Example 30 is followed and the light stability of the samples determined. Polyethylene stabilized with the above benzoate is found to be much more stable than the unstabilized polyethylene or the polyethylene stabilized only with an antioxidant.

EXAMPLE 15

A quantity of SBR emulsion containing 100 g of rubber (500 ml of 20% SBR obtained from Texas U.S., Synpol 1500) previously stored under nitrogen, is placed in a beaker and stirred vigorously. The pH of the emulsion is adjusted to 10.5 with a 0.5N NaOH solution.

To the emulsion is added 50 ml of 25% NaCl solution. A 6% NaCl solution adjusted with hydrochloric acid to a pH 1.5 is added in a thin stream with vigorous stirring. When pH 6.5 is reached, the rubber begins to coagulate and the addition is slowed down in order to maintain uniform agitation. The addition of the acidic 6% NaCl solution is terminated when a pH 3.5 is reached. The coagulated crumb-rubber slurry at pH 3.5 is stirred for ½ hour.

The coagulated rubber is isolated by filtration through cheese cloth, and rinsed with distilled water. After three subsequent washings with fresh distilled water, the coagulated rubber is dried, first at 25 mm Hg and finally to constant weight under high vacuum (<1 mm) at 40°–45° C.

The dried rubber (25 g) is heated under nitrogen at 125° C in a Brabender mixer and to this is added with mixing 0.25 g (0.5%) of trimethylolethane-tris-{4-(3,5-di-t-butyl-di-t-butyl-4-hydroxybenzoyloxy)-3,5-di-t-butylbenzoate}. The composition is mixed for 5 minutes after which it is cooled and compression molded at 125° C into 5 inch × 0.025 inch plaques.

The plaques are exposed to a xenon arc weatherometer and the color measurement (L-b) is made after 45, 125 and 290 hours. The samples stabilized with the above benzoate is found to be much more light stable than the unstabilized samples.

EXAMPLE 16

To 50 g of polyacetal resin containing 0.1% of an acid scavenger, dicyandiamide, is added 0.2% by weight of glycerol-tris-{4-(3,5-di-t-butyl-4-hydroxybenzoyloxy)-3,5-di-t-butylbenzoate}, and milled for 7 minutes at 200° C in a Brabender Plastirecorder. The milled formulation is subsequently pressed into a 40 mil sheet at 215° C at 350 psi for 90 seconds then cooled quickly in a cold press at 350 psi. The stabilized sheets are then remolded for 2 minutes at contact pressure and for 3 minutes at 300 psi at 215° C to give plaques 1½ inch × 2¼ inch × 125 mil. Thereafter, the testing procedure of Example 13 is followed to determine the light stability of the samples. The stabilized samples are found to be much more stable than the unstabilized samples.

EXAMPLE 17

Unstabilized thoroughly dried polyethylene terephthalate chips are dry blended with 1.0% of pentaerythritol tetrakis-{4-(3,5-di-t-butyl-4-hydroxybenzoyloxy)-3,5-di-t-butylbenzoate}. 60/10 denier multifilament is melt spun at a melt temperature of 290° C. The oriented fiber is wound on white cards and exposed in a Xenon Arc Fadeometer. Color measurements are made periodically with a Hunter Color Difference Meter Model D25. The stabilized samples are found to be much more light stable than the unstabilized samples.

What is claimed is:

1. A composition of matter stabilized against degradation which comprises an organic material subject to oxidative and ultraviolet light degradation and from 0.01 to 5% by weight of the stabilized composition of a benzoyloxybenzoate having the formula

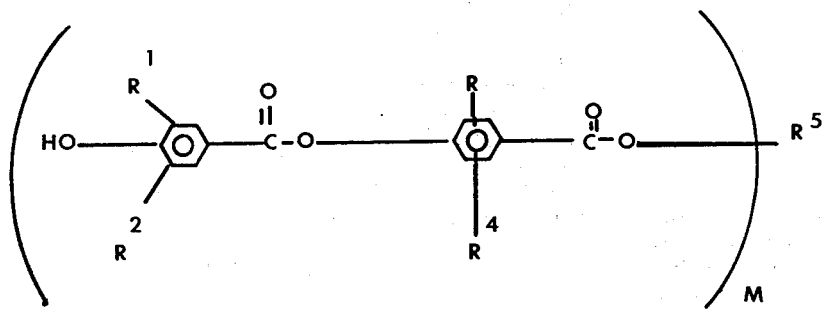

wherein
$R^1$, $R^2$ and $R^3$ are lower alkyl or lower cycloalkyl groups,
$R^4$ hydrogen, lower alkyl or lower cycloalkyl,
$R^5$ is alkylene or oxyalkylene having up to 18 carbon atoms, and
$m$ is an integer from 2 to 4.

2. A composition of claim 1 wherein said organic material is a polyolefin.

3. A composition of claim 2 wherein in said benzoyloxybenzoate
$R^1$ and $R^2$ are branched alkyl, and
$R^5$ is alkylene.

4. A composition of claim 2 wherein in said benzoyloxybenzoate
$R^1$ and $R^2$ are branched alkyl and
$R^5$ is oxyalkylene.

5. A composition of claim 2 wherein in said benzoyloxybenzoate
$R^1$, $R^2$, $R^3$ and $R^4$ are tert-butyl groups, and
$R^5$ is alkylene.

6. A composition of claim 2 wherein in said benzoyloxybenzoate
$R^1$, $R^2$, $R^3$ and $R^4$ are tert-butyl groups, and
$R^5$ is oxyalkylene.

7. A composition of claim 1 wherein polypropylene is stabilized with
1,6-hexanediol-bis-[4-(3,5-di-t-butyl-4-hydroxybenzoyl oxy)-3,5-di-t-butylbenzoate].

8. A composition of claim 1 wherein polypropylene is stabilized with
triethylene glycol-bis-[4-(3,5-di-t-butyl-4-hydroxybenzoyloxy)-3,5-di-t-butylbenzoate].

9. A composition of claim 1 wherein polypropylene is stabilized with
2,2-dimethyl-1,3-propanediol-bis-[4-(3,5-di-t-butyl-4-hydroxybenzoyloxy)-3,5-di-t-butylbenzoate].

10. A composition of claim 1 containing additionally a hindered phenolic antioxidant.

11. A composition of claim 10 wherein said antioxidant is dioctadecyl 3,5-di-t-butyl-4-hydroxybenzylphosphonate.

* * * * *